United States Patent [19]
Nemeth et al.

[11] Patent Number: 5,687,754
[45] Date of Patent: Nov. 18, 1997

[54] AUTOMATIC DRAIN VALVE WITH INTERNAL PRESSURE BOOSTER VALVE

[75] Inventors: Leonard R. Nemeth, Northfield; William S. Stumphauzer, Elyria; Hugh F. Groth, Richfield, all of Ohio

[73] Assignee: Precision Pneumatics, LLC, Lorain, Ohio

[21] Appl. No.: 698,569

[22] Filed: Aug. 15, 1996

[51] Int. Cl.⁶ .................................................. F16K 31/34
[52] U.S. Cl. ........................................ 137/179; 137/195
[58] Field of Search .................................. 137/179, 195

[56] References Cited

U.S. PATENT DOCUMENTS

| | | | |
|---|---|---|---|
| 3,807,431 | 4/1974 | Svanteson | 137/413 X |
| 3,993,090 | 11/1976 | Hankinson | 137/195 |
| 4,444,217 | 4/1984 | Cummings et al. | 137/195 |
| 4,562,855 | 1/1986 | Cummings et al. | 137/195 |
| 4,574,829 | 3/1986 | Cummings et al. | 137/195 |
| 4,779,640 | 10/1988 | Cummings et al. | 137/195 |
| 5,004,004 | 4/1991 | Cummings | 137/195 |
| 5,417,237 | 5/1995 | Stumphauzer et al. | 137/195 |

*Primary Examiner*—Gerald A. Michalsky
*Attorney, Agent, or Firm*—Paul E. Milliken; Lee A. Germain

[57] ABSTRACT

An automatic float-activated drain valve for a liquid reservoir used in the accumulation of condensable materials and other contaminants from pneumatic systems and the like. The float is connected by a flexible tether to a lever arm which opens a pilot valve when the reservoir fills with water and the float moves to the top of the reservoir. The pilot valve permits air pressure to flow to an actuator which opens the drain valve. The pilot valve is in communication with a check valve which releases air pressure into the interior of the reservoir to rapidly expel water through the drain valve when the pilot valve is opened.

20 Claims, 4 Drawing Sheets

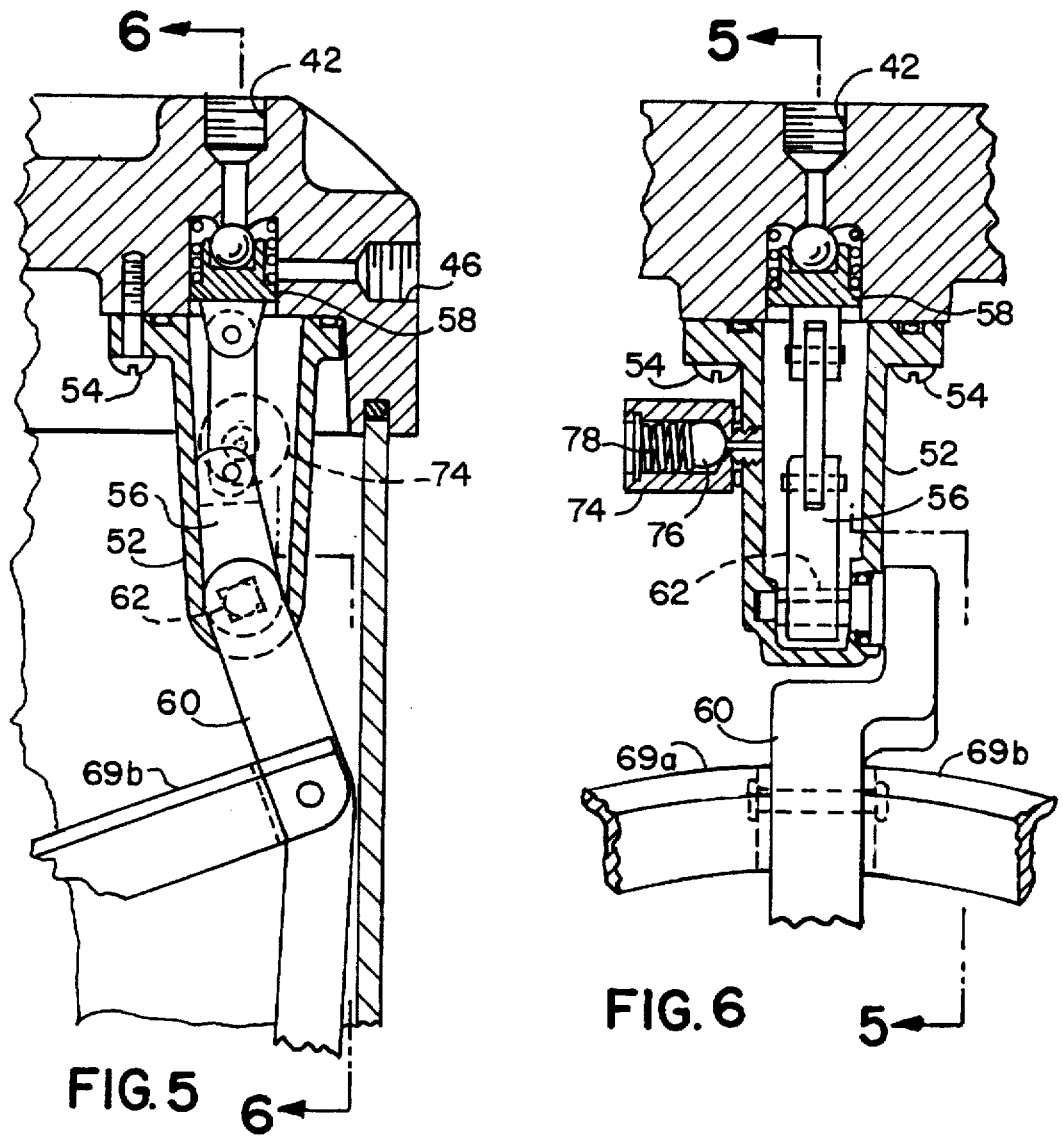
FIG. 5
FIG. 6
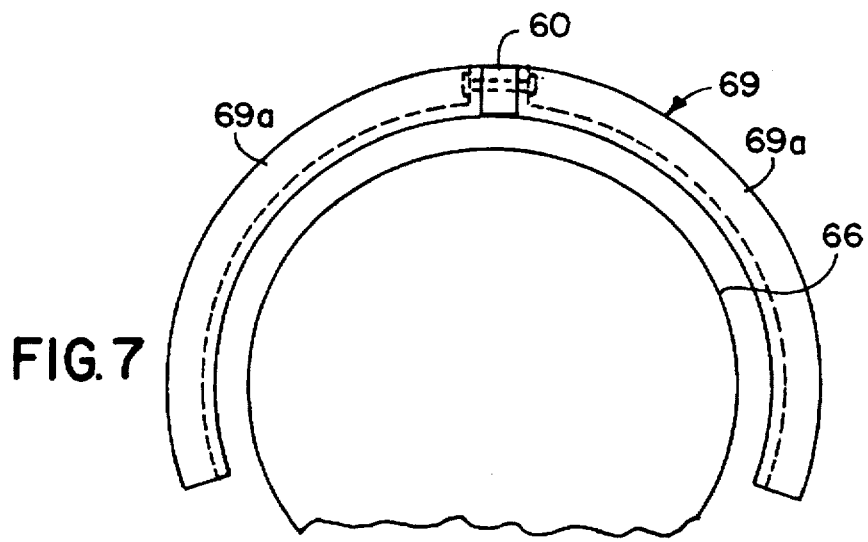
FIG. 7

AUTOMATIC DRAIN VALVE WITH INTERNAL PRESSURE BOOSTER VALVE

TECHNICAL FIELD

This invention relates generally to float-activated drain systems for liquid reservoirs, and more particularly to an automatic drain valve for traps used in the accumulation of condensable materials and other contaminants from pneumatic systems and the like which valve includes a booster valve which provides increased internal pressure to cause liquid to drain from the drain valve more rapidly.

BACKGROUND OF THE INVENTION

It is conventional to use filters and separators for removing foreign objects, and condensing and removing water and other condensable liquids, from pressurized air lines and the like. Typically, such filters include an air inlet, an air outlet and a filtering element mounted between these elements in the flow path. Such filters also include a reservoir or filter bowl through which the air flow is at least partially passed causing the moisture and other condensables in the air to be coalesced and condensed on the inside surface of the reservoir or bowl. The force of gravity causes such condensed materials to accumulate at the bottom of the reservoir together with any other foreign objects. Periodically, this accumulated material must be discharged when the reservoir or filter bowl has become full of material.

Various types of drain systems with automatic valves have been devised to discharge such accumulated material. Examples of such devices are shown in U.S. Pat. No. 3,993,090 issued to Paul M Hankinson, and in U.S. Pat. Nos. 4,444,217, 4,562,855, and 4,574,829 all of which are issued to Ernie W. Cummings and Nick Valk. All the above patents disclose the use of magnetic coupling members within a reservoir which translate the movement of a float within the reservoir to open and close a pilot valve which in turn causes the opening and closing of a drain valve. When the reservoir fills with water and the float rises the magnetic coupling members interact to open the pilot valve and thereby open the drain valve. When the float returns to the bottom of the reservoir the magnetic coupling members interact to cause the pilot valve to close and thereby close the drain valve.

A problem can occur in the devices described in the above patents when the magnetic coupling members and related moving parts become coated with corrosion or other or deposits of contaminates which may be present in the water. Such accumulations can cause a failure of the float to rise properly or the pilot valve may stick in either the open or closed position.

U.S. Pat. No. 5,417,237 issued to William C Stumphauzer and Hugh F Groth eliminated the need for magnetic coupling devices which may be prone to sticking when accumulations of corrosion and contaminates are present on the surface of the magnetic coupling members and other related working parts of the drain valve system.

This invention is a further improvement on the Stumphauzer et al U.S. Pat. No. 5,417,237 and provides a means of automatically injecting a positive internal pressure into the water collecting reservoir to rapidly expel water from the reservoir through the drain valve when the drain valve is automatically opened.

OBJECTS OF THE INVENTION

An object of this invention is to provide an automatic float activated drain valve for a reservoir which uses a minimum number of moving parts located within the reservoir.

Another object of this invention is to provide an automatic float actuated drain valve which is greatly reduces the chances of sticking due to accumulations of corrosion and contaminates on the surfaces of the moving parts of the actuating system.

Another object of this invention is to provide an automatic float actuated drain valve which connects to a water collecting reservoir and which has a means for automatically injecting internal pressure into the reservoir to rapidly expel water from the reservoir when the drain valve is opened.

Still another object of the invention is to provide an automatic float actuated drain valve which is simple, and easy to manufacture and service.

These and other objects of the invention will become more fully apparent in the following description and the attached drawings.

SUMMARY OF THE INVENTION

This invention is an automatic drain valve system for reservoirs for accumulating liquids in a pneumatic system comprising: a reservoir having a top, a bottom and sidewall means extending therebetween, the reservoir having an inlet opening and an outlet opening connected to a pneumatic system and said reservoir having an outlet drain in the bottom thereof, a drain valve for the reservoir mounted external of the reservoir and connected to the outlet drain, a pneumatic valve operator mounted external to said reservoir and attached to said drain valve for opening and closing the valve, a buoyant float positioned within the reservoir responsive to liquid level in the reservoir to move between a high position and a low position within the reservoir, a normally closed pilot valve mounted in the top of the reservoir, actuation lever means having a first end operatively connected to the pilot valve and extending downwardly inside the reservoir with a second end positioned near the bottom of the reservoir when the float is in a low position within the reservoir, the second end of the actuation lever means being connected to the float, a first pneumatic means connected between the pilot valve and the valve operator to cause the valve operator to open the drain valve when the pilot valve is opened by the float rising to a high position in the reservoir, and to close the drain valve when the pilot valve is closed by the float sinking to a low position in the reservoir, and a second pneumatic means connected between the pilot valve and the interior of the reservoir to provide internal pressure to the reservoir when the pilot valve is opened.

DESCRIPTION OF THE DRAWINGS

FIG. 5 is a fragmentary vertical cross-sectional view of the pilot valve and actuation lever taken on line 5—5 of FIG. 6;

FIG. 6 is a fragmentary vertical cross-sectional view of the pilot valve and actuation lever taken on line 6—6 of FIG. 5; and FIG. 7 is a top plan view of a float guide arm assembly attached to the actuation lever of the pilot valve.

DESCRIPTION OF THE PREFERRED EMBODIMENTS

Figure 1:
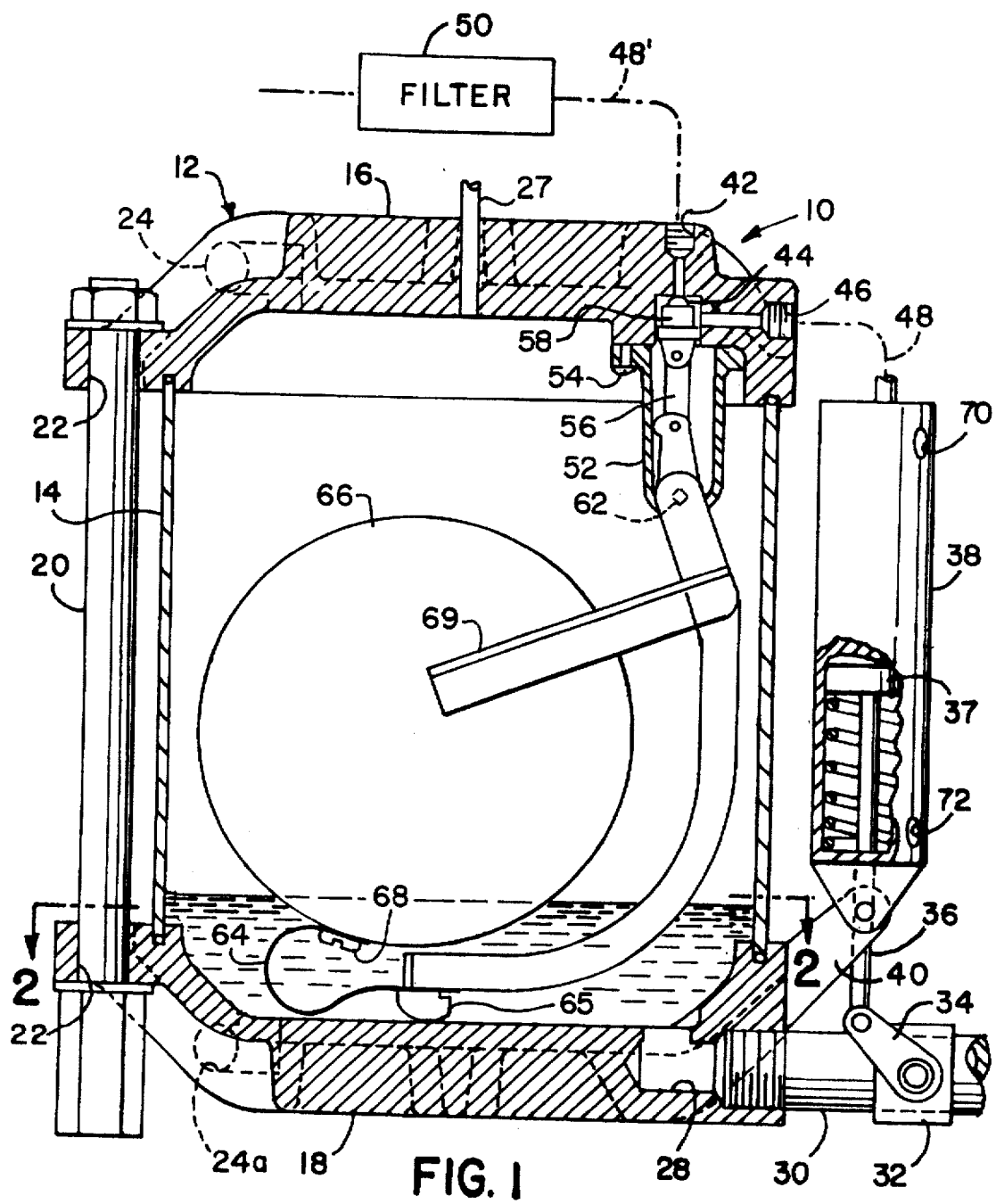
FIG. 1 is a vertical cross-sectional view a reservoir using the invention taken on line 1—1 of FIG. 2.
Figure 2:
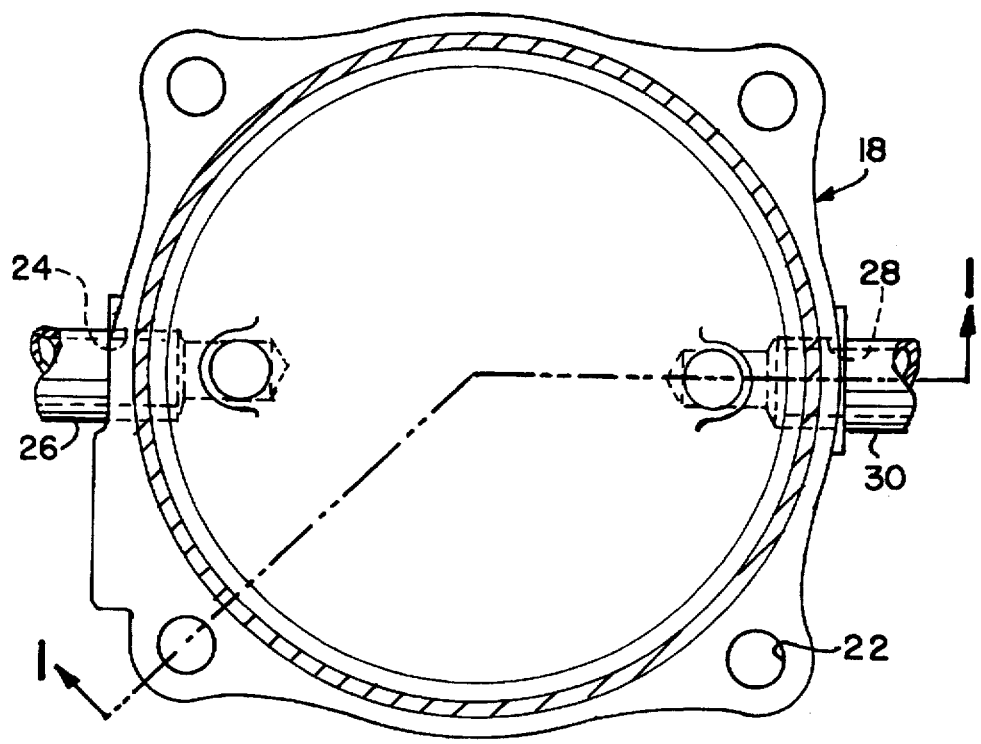
FIG. 2 is a horizontal cross-sectional view of a reservoir of the invention taken on line 2—2 of FIG. 1.
Figure 3:
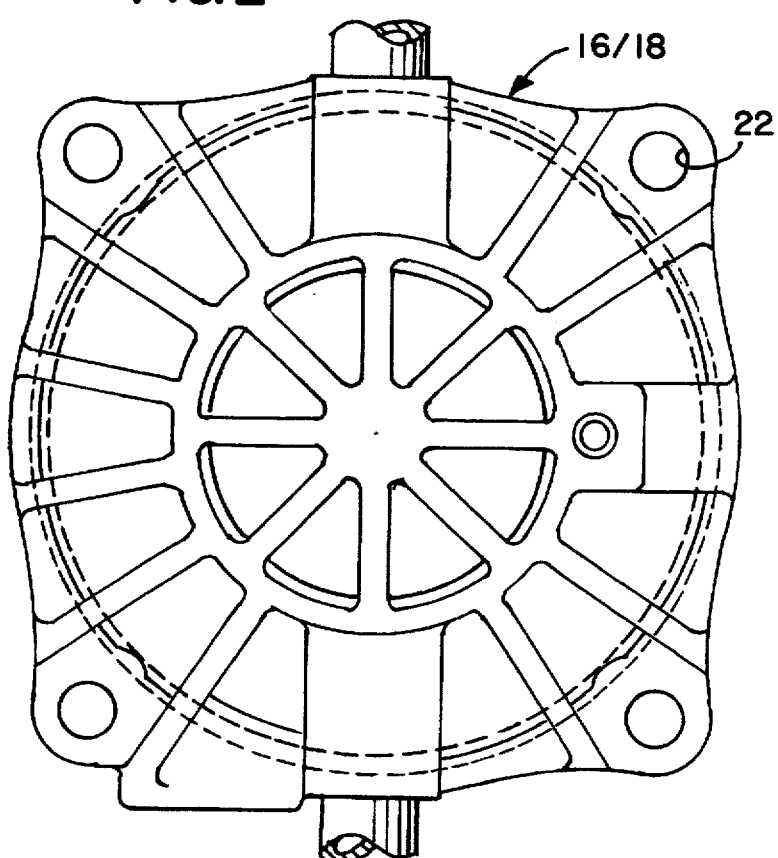
FIG. 3 is a plan view of a casting which can be used as either the top of bottom of the reservoir of the invention.

Referring now to the drawings as shown in FIGS. 1 through 4, a liquid accumulation reservoir assembly for a pneumatic system is indicated generally by the numeral 10. The reservoir assembly 10 may be connected to any conventional pneumatic system (not shown). Such a pneumatic system would normally include a compressor pump or other source of pneumatic pressure, a pressure tank for storing compressed air or other gas and a series on pneumatic lines linking, the pump, the storage tank and any other equipment used therewith and the system would also have pneumatic lines linking the systems to the reservoir assembly 10.

The reservoir assembly 10 has a reservoir 12 which is formed from a cylindrical sidewall 14, a top 16 and a bottom 18 which are formed as substantially identical rib reinforced castings except for different inlet and outlet ports drilled therein.

The top 16 and bottom 18 sealingly engage the top and bottom edges respectively of the sidewall 14 and form a closed container for accumulating water and other residual materials that form in a pneumatic system. The top 16 and bottom 18 are clamped against the edges of the sidewall 14 by a four bolts 20 which pass through holes 22 in the top 16 and bottom 18.

The top 16 has an inlet port 24 which receives an inlet line 26 connected to an outlet port on a compressed air storage tank (not shown). The line 26 permits condensed water to drain from the storage tank into the reservoir 12. The bottom 18 may also have an optional inlet port 24a if desired.

The top 16 also has a pressure differential line or whisper vent 27 in communication between the interior of the reservoir 12 and the outside atmosphere. The vent 27 permits the release of any pressure within the interior of the reservoir 12 to permit condensate to enter the reservoir through the top inlet port 24 or the bottom inlet port 24a.

An outlet drain port 28 is located in the bottom 18 to drain water from the reservoir 12 periodically. The drain port 28 is connected to a drain line 30 in which is located a valve 32 which is opened and closed by a valve arm 34. The valve arm 34 is operated by a piston rod 36 and a piston 37 of a pneumatic actuator 38 which is attached by a bracket 40 to the bottom 18. The piston 37 and piston rod is biased upwardly by a return spring 39 to hold the valve 32 in a normally closed position.

In the top 16 of the reservoir 12, a pilot valve inlet port 42 connects through a pilot valve 44 to a pilot valve outlet port 46 connected through line 48 to the actuator 38. The inlet port 42 is connected through a line 48' passing through a filter 50 to a source of pneumatic pressure in a pneumatic system.

A pilot valve linkage housing 52 is attached by screws 54 to the bottom of the top 16 in alignment with the pilot valve 44. The linkage housing 52 retains a toggle linkage 56 having one end connected to a moveable valve closure member 58 and the other end connected to a lever arm 60 which is pivotally connected at a pivot pin 62 to the linkage housing 52. As shown in FIGS. 5 and 6, the pivot pin 62 is fixed to the lever arm 60 so that it rotates with movement of the lever arm and it is fixed to the end portion of the linkage 56 by means of a square portion or key so that movement of the lever arm causes the end portion of the linkage to rotate for a short distance with the pivot pin 62 and the lever 60 to pull on the pilot valve closure member 58 and open the pilot valve.

The lever arm 60 is substantially shaped like a curved L and extends downwardly within the reservoir 12 and then substantially horizontally across the bottom of the reservoir 12. A flexible tether 64 has one end connected to the end of the lever arm 60 by a bumper member 65 and the other end connected to the bottom of a spherical float 66 by a screw 68. A semicircular float guide assembly 69 has two curved arms 69a and 69b attached to the lever arm 60 as shown if FIG. 7 in a position to surround and guide the up and down movement of the float 66 as the water level rises and falls within the reservoir 12. There should be sufficient clearance between the arms 69a and 69b and the widest diameter of the float so that there is no chance of the float becoming stuck between the guide arms and causing the lever arm 60 to open the pilot valve 44 prematurely.

Figure 4:
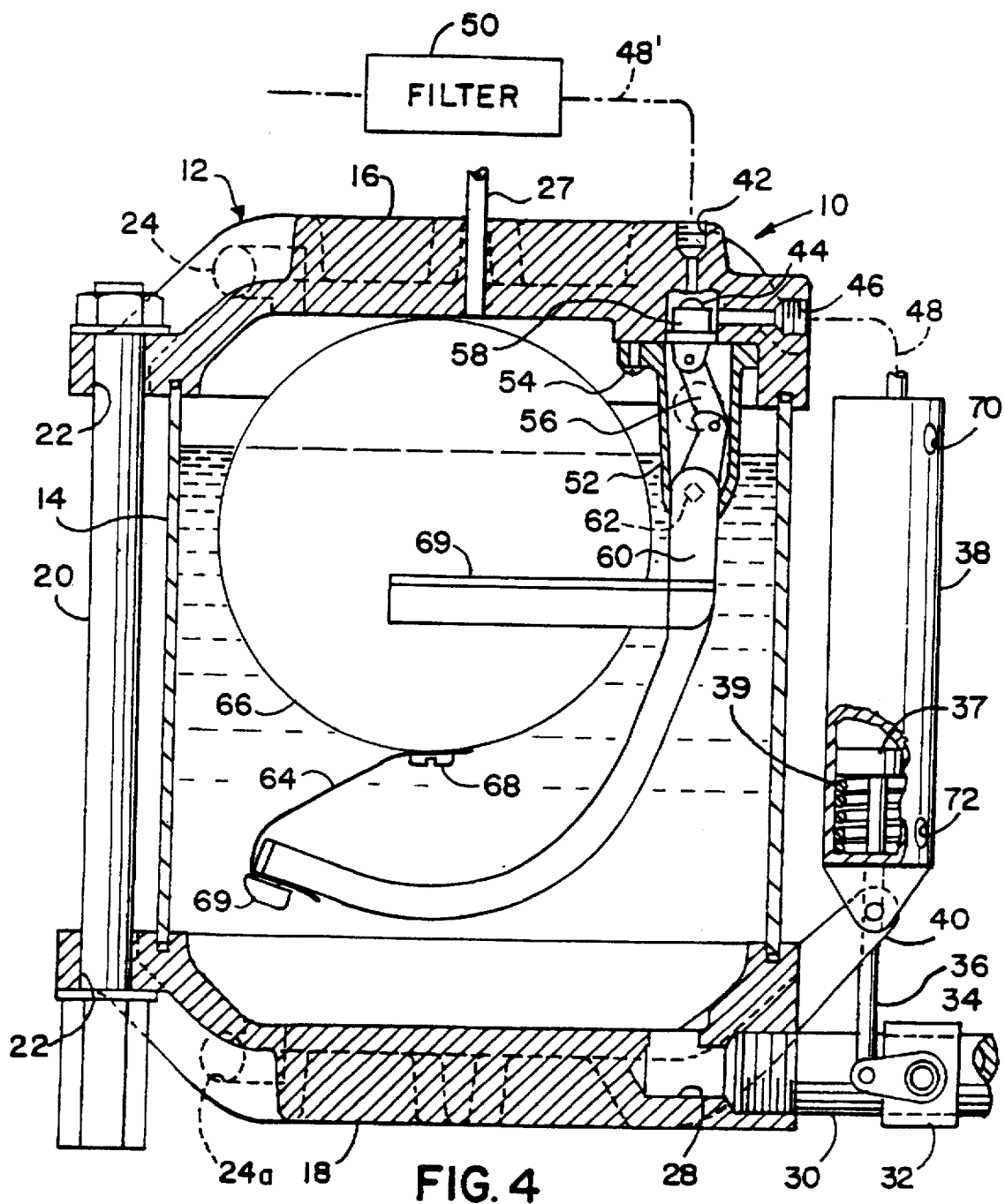
FIG. 4 is a vertical cross-sectional view of the reservoir of the invention similar to FIG. 1 but showing a float in a raised position inside the reservoir with the reservoir filled with water.

As shown in FIG. 1, when the reservoir 12 is empty of liquid or at a very low level float 66 is at the bottom of the reservoir and the lever arm is at such a position that the pilot valve 44 is closed. As long as the pilot valve 44 is closed, the drain valve 32 remains closed. When the reservoir 12 is sufficiently filled with water as shown in FIG. 4, the float 66 rises to the top of the reservoir 12 and the tether 64 pulls the lever arm 60 upward causing it to pivot around pivot pin 62 and move the toggle linkage 56 to a position where it opens the pilot valve 44. Opening of the pilot valve 44 causes air pressure to pass through the line 48 into the upper end of the actuator 38 and thereby overcome the upward force of the spring 39 and move the piston 37, the piston rod 36 and valve arm 34 downwardly to open the valve 32 and allow the water to drain through the line 30 until the reservoir 12 is at least substantially empty. The actuator 38 has a has an upper port 70 at the upper end and a lower port 72 at the lower end. The lower port 72 serves as an exhaust line when pressure is flowing through the line 48 into the upper end of the actuator 38 and permits air to flow back into the lower end of the actuator 38 when the piston rod 36 returns to the raised position shown in FIG. 1 in which the valve 32 is closed. The upper port 70 permits air to be exhausted from the upper end of the actuator when the piston 37 is moved upwardly by the return spring 39. As an alternative to the upper port 70 a pressure release valve can be installed in the line 48 to serve the same function as the port 70.

As the water level drops, the float 66 returns to the bottom of the reservoir and the lever arm 60 returns to the position shown in FIG. 1. This causes closing of the pilot valve 44 and in turn the drain valve 32. It should be understood that even through the upper port 70 remains open at all times, when the pilot valve 44 is open and air flows though the line 48 into the upper end of the actuator, there is still a sufficient build-up of pressure to force the piston 37 downwardly to open the valve 32.

It has also been found that when the lever arm 60 causes the pilot valve 44 to open and thereby open the drain valve 32, it is desirable to expel the water from the reservoir 12 as rapidly as possible while the drain valve 32 is open. In order to accomplish rapid expulsion of the water, a check valve 74 has been inserted in a threaded hole in the pilot valve linkage housing 52 in communication with the interior of the housing 52. The check valve 74 has a ball 76 biased in a closed valve position by compression spring 78 as shown in FIG. 6. When the pilot valve 44 is closed, the spring 78 holds the ball 76 closed in the check valve 74. When the pilot valve 44 is opened, air pressure flows into the housing 52 and overcomes the pressure of spring 78 on the ball 76 and opens the check valve 74, which serves as a booster valve, thereby permitting air pressure from the housing 52 to flow into the interior of the reservoir 12 and exert pressure on the water to rapidly expel it through the outlet drain 28 while the valve 32 is open. The inlet orifice of the check valve 74 is larger than the orifice of the whisper vent 27 and therefore, when the pilot valve 44 is open the air pressure will always flow in through the check valve 74 faster than it is exhausted through the whisper vent 27. This assures that there will always be sufficient pressure in the reservoir when needed to expel water when the drain valve 32 is open.

After the pilot valve 44 and the drain valve 32 close any pressure remaining in the reservoir 12 is exhausted through the whisper vent 27 so that the flow of water 12 from the inlet line 24 into the reservoir can resume.

The above described process is automatically repeated each time the reservoir fills with water.

It is understood that the reservoir can have additional ports to those shown in FIGS. 1 through 4 and can be connected to additional lines in a pneumatic system depending upon the overall arrangement of the particular system with which the reservoir 12 is used. It should also be understood that various other minor changes be made in the arrangement of the lever arm, the float, the pilot valve, and the check valve without departing from the scope of the invention.

We claim:

1. An automatic drain valve system for reservoirs containing liquids comprising:

a reservoir provided with an inlet opening and an outlet drain;

a drain valve for the reservoir mounted external of the reservoir and connected to the outlet drain;

a pneumatic valve operator mounted external to said reservoir and attached to said drain valve for opening and closing the valve;

a buoyant float positioned within the reservoir responsive to liquid level in the reservoir to move between a high position and a low position within the reservoir;

a normally closed pilot valve mounted in fixed relationship to the reservoir;

actuation lever means having a first end operatively connected to the pilot valve and extending inside the reservoir with a second end positioned near the bottom of the reservoir when the float is in a low position within the reservoir;

flexible tether means connecting the second end of the actuation lever means to the float, said tether means being of sufficient length that it will permit the float to rise a certain distance from a low position within the reservoir before exerting a pull on the actuation lever means and thereafter moving to a high position within the reservoir while exerting a pull on said actuation lever means to cause the pilot valve to open;

a first pneumatic means connected between the pilot valve and the valve operator to cause the valve operator to open the drain valve when the pilot valve is opened by the float rising to a high position in the reservoir, and to close the drain valve when the pilot valve is closed by the float sinking to a low position in the reservoir; and a second pneumatic means connected between the pilot valve and the interior of the reservoir to provide internal pressure to the reservoir when the pilot valve is opened to open the drain valve.

2. The drain valve system claimed in claim 1 wherein the pilot valve is located in an upper portion of the reservoir and the actuation lever means extends downwardly to a position near the bottom the reservoir then toward the center of the reservoir to a position between the bottom of the reservoir and the float.

3. The drain valve system claimed in claim 1 wherein the actuation lever means comprises a substantially L-shaped lever connected through a toggle linkage to a valve stem.

4. The drain valve system claimed in claim 1 wherein the outlet drain is located in the bottom of the reservoir.

5. The drain valve system claimed in claim 1 wherein the inlet opening is located at the bottom of the reservoir.

6. The drain valve system claimed in claim 1 wherein the pilot valve is located in the top of the reservoir.

7. The drain valve system claimed in claim 1 wherein the drain valve is located in close proximity to the bottom of the reservoir.

8. The drain valve system claimed in claim 1 wherein the second pneumatic means is a spring biased ball check valve which opens when the pilot valve is open to pressurize the interior of the reservoir and closes when the pilot valve is closed to prevent condensate from passing from the reservoir into the pilot valve.

9. An automatic drain valve system for reservoirs for accumulating liquids in a pneumatic system comprising:

a reservoir having a top, a bottom and sidewall means extending therebetween, the reservoir having an inlet opening and an outlet opening connected to a pneumatic system and said reservoir having an outlet drain in the bottom thereof;

a drain valve for the reservoir mounted external of the reservoir and connected to the outlet drain;

a pneumatic valve operator mounted external to said reservoir and attached to said drain valve for opening and closing the valve;

a buoyant float positioned within the reservoir responsive to liquid level in the reservoir to move between a high position and a low position within the reservoir;

a normally closed pilot valve mounted in the top of the reservoir;

actuation lever means having a first end operatively connected to the pilot valve and extending downwardly inside the reservoir with a second end positioned near the bottom of the reservoir when the float is in a low position within the reservoir;

flexible tether means connecting the second end of the actuation lever means to the float, said tether means being of sufficient length that it will permit the float to rise a certain distance from a low position within the reservoir before exerting a pull on the actuation lever means and thereafter moving to a high position within the reservoir while exerting a pull on said actuation lever means to cause the pilot valve to open;

a first pneumatic means connected between the pilot valve and the valve operator to cause the valve operator to open the drain valve when the pilot valve is opened by the float rising to a high position in the reservoir, and to close the drain valve when the pilot valve is closed by the float sinking to a low position in the reservoir; and a second pneumatic means connected between the pilot valve and the interior of the reservoir to provide internal pressure to the reservoir when the pilot valve is opened.

10. The drain valve system claimed in claim 9 wherein the actuation lever means extends downwardly to a position near the bottom the reservoir then toward the center of the reservoir to a position between the bottom of the reservoir and the float.

11. The drain valve system claimed in claim 9 wherein the actuation lever means comprises a substantially L-shaped lever connected through a toggle linkage to a valve stem.

12. The drain valve system claimed in claim 9 wherein top and bottom are of substantially identical shape but have different ports drilled therein.

13. The drain valve system claimed in claim 9 wherein the sidewall means is of cylindrical shape.

14. The drain valve system claimed in claim 9 wherein the second pneumatic means is a spring biased ball check valve which opens when the pilot valve is open to pressurize the interior of the reservoir and closes when the pilot valve is closed to prevent condensate from passing from the reservoir into the pilot valve.

15. An automatic drain valve system for reservoirs for accumulating liquids in a pneumatic system comprising:

a reservoir having a top, a bottom and sidewall means extending therebetween, the reservoir having an inlet opening and an outlet opening connected to a pneumatic system and said reservoir having an outlet drain in the bottom thereof;

a drain valve for the reservoir mounted external of the reservoir and connected to the outlet drain;

a pneumatic valve operator mounted external to said reservoir and attached to said drain valve for opening and closing the valve;

a buoyant float positioned within the reservoir responsive to liquid level in the reservoir to move between a high position and a low position within the reservoir;

a normally closed pilot valve mounted in the top of the reservoir;

actuation lever means having a first end operatively connected to the pilot valve and extending downwardly inside the reservoir with a second end positioned near the bottom of the reservoir when the float is in a low position within the reservoir;

the second end of the actuation lever means being connected to the float, a first pneumatic means connected between the pilot valve and the valve operator to cause the valve operator to open the drain valve when the pilot valve is opened by the float rising to a high position in the reservoir, and to close the drain valve when the pilot valve is closed by the float sinking to a low position in the reservoir; and a second pneumatic means connected between the pilot valve and the interior of the reservoir to provide internal pressure to the reservoir when the pilot valve is opened.

16. The drain valve system claimed in claim 15 wherein the second pneumatic means is a spring biased ball check valve which opens when the pilot valve is open to pressurize the interior of the reservoir and closes when the pilot valve is closed to prevent condensate from passing from the reservoir into the pilot valve.

17. The drain system as claimed in claim 16 including a constantly open pressure relief vent which permits pressure to exhaust slowly from the interior of the reservoir.

18. The drain system as claimed in claim 17 wherein the ball check valve has a larger opening than the pressure relief vent to cause a pressure buildup inside the reservoir when the ball check valve is opened.

19. The drain system as claimed in claim 15 wherein the float is of circular cross section.

20. The drain system as claimed in claim 19 including a C-shaped guide member attached to the actuation lever means in such a position as to at least partially surround the float and guide the float in a substantially centered position within the reservoir as the float moves up and down in response to rise and fall of condensate within the reservoir.

* * * * *